United States Patent Office 2,801,923
Patented Aug. 6, 1957

2,801,923

COMPOSITIONS FOR PREPARING PUDDINGS

Leonard Sidney Stoloff, New Bedford, Mass., assignor to Seaplant Chemical Corporation, New Bedford, Mass., a corporation of Delaware No Drawing. Application May 26, 1954,
Serial No. 432,620

18 Claims. (Cl. 99—139)

This invention relates to dry compositions which may be mixed with cold milk to form a pudding.

According to this invention, a dry powder mix is provided which contains a hydrocolloid extractive obtained from red seaweeds (Rhodophyceae) of the class Gigartinaceae having the ability to modify the nature of the proteins in milk without the application of heat, and certain salts capable of providing cations and anions which react to form a precipitate of calcium or magnesium phosphate, carbonate, or sulfate in situ when mixed with milk. If desired to modify the consistency of the pudding, a pulverulent pregelatinized starch may be added to the dry composition. When such a dry pudding composition is intimately mixed with cold milk, the hydrocolloid extractive serves to set the milk into a light gel and the co-formation of a precipitate of calcium or magnesium phosphate, carbonate or sulfate enhances the gel structure produced by the hydrocolloid extractive to render it stronger and shorter; this short texture being highly desired for good eating quality in a milk pudding.

Although the precipitates of calcium or magnesium phosphate, carbonate or sulfate are effective, I have obtained best results from salts which co-precipitate as calcium phosphate and calcium carbonate. The gel formed with milk, hydrocolloid extractive and salt mixtures which form in situ precipitates of calcium phosphate and calcium carbonate is of a custard consistency and although it is not necessary to include starch to obtain a pudding which will set satisfactorily, a pregelatinized starch may be added to the pudding composition if the more common type of body or consistency produced by commercial instant type puddings is desired. However, the amount of starch required is much less than would be required if the composition did not contain the gel forming hydrocolloid extractive. Moreover, the presence of the hydrocolloid extractive together with the precipitating salts enhances the effectiveness of the starch.

In the following Table A are set forth illustrative and preferred dry compositions made in accordance with the invention and the amounts of the ingredients which may be added to one pint of milk to produce a quick setting comestible pudding of the custard type:

TABLE A

| | Examples | |
|---|---|---|
| | I | II |
| | Grams | Grams |
| Cane sugar | 70.00 | 70.00 |
| Seaweed hydrocolloid extractive [1] | 3.00 | 3.00 |
| Calcium gluconate.H$_2$O | 15.60 | |
| Calcium sulfate, anhydrous | | 4.30 |
| Disodium ortho-phosphate, anhydrous | 1.96 | 1.96 |
| Sodium carbonate | 2.22 | 2.22 |
| Flavor and color | to taste | to taste |

[1] SeaKem, Type 402.

In the following Table B are set forth illustrative compositions and preferred dry compositions made in accordance with the invention and the amounts of ingredients which may be added to one pint of milk to produce quick setting comestible pudding of the starch base type:

TABLE B

| | Examples | | |
|---|---|---|---|
| | I | II | III |
| | Body on Mixing | | |
| | light | moderate | heavy |
| | Grams | Grams | Grams |
| Cane sugar | 70.00 | 70.00 | 70.00 |
| Pregelatinized starch | 25.00 | 25.00 | 25.00 |
| Seaweed hydrocolloid extractive [1] | 1.35 | 1.35 | 1.35 |
| Calcium gluconate.H$_2$O | 15.60 | | |
| Calcium sulfate, anhydrous | | 4.30 | |
| Calcium acetate, anhydrous | | | 5.50 |
| Disodium orthophosphate, anhydrous | 1.96 | 1.96 | 1.96 |
| Sodium carbonate | 2.22 | 2.22 | 2.22 |
| Flavor and color | to taste | to taste | to taste |

[1] SeaKem, Type 402.

(For chocolate flavor a "solubilized" cocoa, sugar preparation may be substituted for the cane sugar.)

In the above illustrative examples equivalent amounts of the corresponding magnesium salts may be substituted for part or all of the calcium salts set forth.

To prepare the composition or dry pudding mix, the ingredients in dry powder form are intimately mixed together. For most rapid action and maximum effectiveness of the seaweed hydrocolloid, it should be milled in dry form with at least an equal weight of granulated sucrose. This milling may be done in the presence of dry salts. Any variety of pregelatinized starch may be used. Preferably it should be fine enough that a large percentage passes through a 200 mesh screen and all through a 150 mesh screen. Milling of the ingredients together is preferable, however, since a more intimate intermixing is assured and such an intimately mixed composition is conducive to a faster action and smoother texture when the composition is mixed with milk to form a pudding.

To prepare the pudding, the dry powder composition is mixed with cold milk; it is stirred slowly with a hand or electric mixer to disperse the powder uniformly through the body of the milk, and then rapidly, and until the product is smooth. Approximately one minute is required to obtain a smooth mix. The mix will then set to a desired custard pudding consistency within a period of the order of thirty minutes, if the milk is at room temperature or lower.

It is to be understood that the examples given above are primarily illustrative and the listed ingredients may be replaced by equivalents and the relative amount of the ingredients may be varied within limits. For instance, any edible salts providing a source of calcium or magnesium cations and phosphate and carbonate anions may be used. Inasmuch as the seaweed hydrocolloid extractive is the essential ingredient in setting the cold milk into a light gel, a sufficient concentration is used to produce this light gel in the milk system. The effect of the added salts varies in degree with the concentration of precipitates formed by them, so that from very small amounts up to amounts which produce an undesirable flavor in the pudding may be employed. For reasons of economy it is desirable to employ precipitating cations and anions in equivalent proportions, although this is not necessary to obtain satisfactory results. Although there are insufficient calcium and magnesium ions in milk to produce the desired effect, the calcium and magnesium which are present in the milk do, to some extent at least, react with the added precipitate-forming anions but it is undesirable to make too much use of the calcium and magnesium naturally present in the milk since changes in the soluble calcium and magnesium in the milk from that normally encountered tend toward an undesirable curdy appearance in the pudding. Analogous magnesium salts may be substituted for the calcium salts as a source for precipitating cations but the calcium salts are preferred since a higher concentration may be used before an undesirable taste is imparted to the pudding. The co-precipitates of calcium and magnesium phosphates and carbonates formed in situ when the dry pudding mix is added to the milk give more desirable effects than those obtained by adding individual salts. The optimum proportions of phosphate and carbonate precipitates are encountered when the precipitate of carbonate accounts for 30% to 70% of the calcium precipitated. I prefer the texture of a pudding which is produced when carbonates account for approximately 60% of the calcium precipitated.

A minimum quantity of hydrocolloid extractive is required, which will depend upon the strength of the extractive and the nature of the milk used to make the pudding. Sufficient hydrocolloid extractive should be used to bring about a light gel when the composition is mixed with cold milk. While an amount of the order of 1.25 grams per pint of milk is preferred, this amount may in some instances be as low as 1 gram per pint of milk and it may be as high as the order of 3 grams per pin of milk. Although even larger amounts could be added, the additional gelling effect is not sufficient to warrant the additional cost. If a custard type pudding is desired, no added starch will be needed. But if a modified texture is desired, it will depend upon how much it is desired to modify the custard texture. The maximum quantity of starch will be reached when the pudding produced is undesirably pasty.

As used herein, the term "red seaweed hydrocolloid extractive" is intended to mean the dry gelose or mucilaginous substance extracted with water from red seaweeds (Rhodophyceae) of the class Gigartinaceae which has the ability to modify the nature of the proteins in a milk system when dissolved in that system; no heat being required for the reaction as is the case of carrageenin, an extractive from the same family of seaweeds. It is available on the market. The seaweed extractives sold under the trade name "SeaKem," Types 402 and 7, are red seaweed hydrocolloidal extractives that have been successfully used.

The terms and expressions which have been employed herein are used as terms of description and not of limitation and there is no intention in the use of such terms and expressions of excluding any equivalent of the features shown and described or portions thereof, but it is recognized that various modifications are possible within the scope of invention claimed.

What is claimed is:

1. A dry composition for producing a pudding when mixed with cold milk comprising a hydrocolloid extractive from red seaweeds (Rhodophyceae) of the class Gigartinaceae; an edible salt containing cations selected from the group consisting of calcium and magnesium and an edible salt containing anions selected from the group consisting of phosphate, carbonate and sulfate reactive with the cations of said cation containing salt to form an insoluble precipitate when said composition is mixed with cold milk.

2. A dry composition for producing a pudding when mixed with cold milk comprising a hydrocolloid extractive from red seaweeds (Rhodophyceae) of the class Gigartinaceae having the ability to modify the nature of the proteins in the milk when dissolved in the milk; calcium gluconate, disodium orthophosphate and sodium carbonate, the anions of said sodium salts being reactive with the cations of said calcium salt to form an insoluble precipitate in the milk system when said composition is mixed with cold milk.

3. A dry composition for producing a pudding comprising a hydrocolloid extractive from red seaweeds (Rhodophyceae) of the class Gigartinaceae having the ability to modify the nature of the proteins in a milk system when dissolved in that system; a water soluble calcium sulfate and edible sodium salts having phosphate and carbonate anions, the cations of said calcium salt and anions of said sodium salts being reactive to form insoluble precipitates in said milk system when said composition is mixed with cold milk.

4. A dry composition for producing a pudding when mixed with cold milk comprising a hydrocolloid extractive from red seaweeds (Rhodophyceae) of the class Gigartinaceae having the ability to modify the nature of the proteins in the milk when dissolved in the milk, a water soluble edible calcium salt capable of providing calcium ions; sodium carbonate and disodium orthophosphate.

5. A dry composition for producing a pudding when mixed with cold milk comprising a hydrocolloid extractive from red seaweeds (Rhodophyceae) of the class Gigartinaceae; calcium acetate; a disodium phosphate and a sodium carbonate.

6. A dry composition as claimed in claim 4 in which the anions of the sodium salts react with the calcium anions present to form an insoluble precipitate when said composition is mixed with cold milk and in which from 30% to 70% of the calcium precipitated is in the form of calcium carbonate.

7. A dry composition as claimed in claim 1 containing pregelatinized starch.

8. A dry composition as claimed in claim 2 containing pregelatinized starch.

9. A dry composition as claimed in claim 3 containing pregelatinized starch.

10. A dry composition as claimed in claim 4 containing pregelatinized starch.

11. A dry composition as claimed in claim 5 containing pregelatinized starch.

12. A composition as claimed in claim 6 containing pregelatinized starch.

13. A composition as claimed in claim 7 containing dry sugar.

14. A composition as claimed in claim 8 containing dry sugar.

15. A composition as claimed in claim 9 containing dry sugar.

16. A composition as claimed in claim 10 containing dry sugar.

17. A composition as claimed in claim 11 containing dry sugar.

18. A composition as claimed in claim 12 containing dry sugar.

References Cited in the file of this patent

UNITED STATES PATENTS

| | | |
|---|---|---|
| 2,400,834 | Le Gloahec | May 21, 1946 |
| 2,441,729 | Steiner | May 18, 1948 |
| 2,446,091 | Humm | July 27, 1948 |
| 2,446,146 | Baker | Apr. 5, 1949 |
| 2,613,150 | Halden | Oct. 7, 1952 |